Figure 1A:
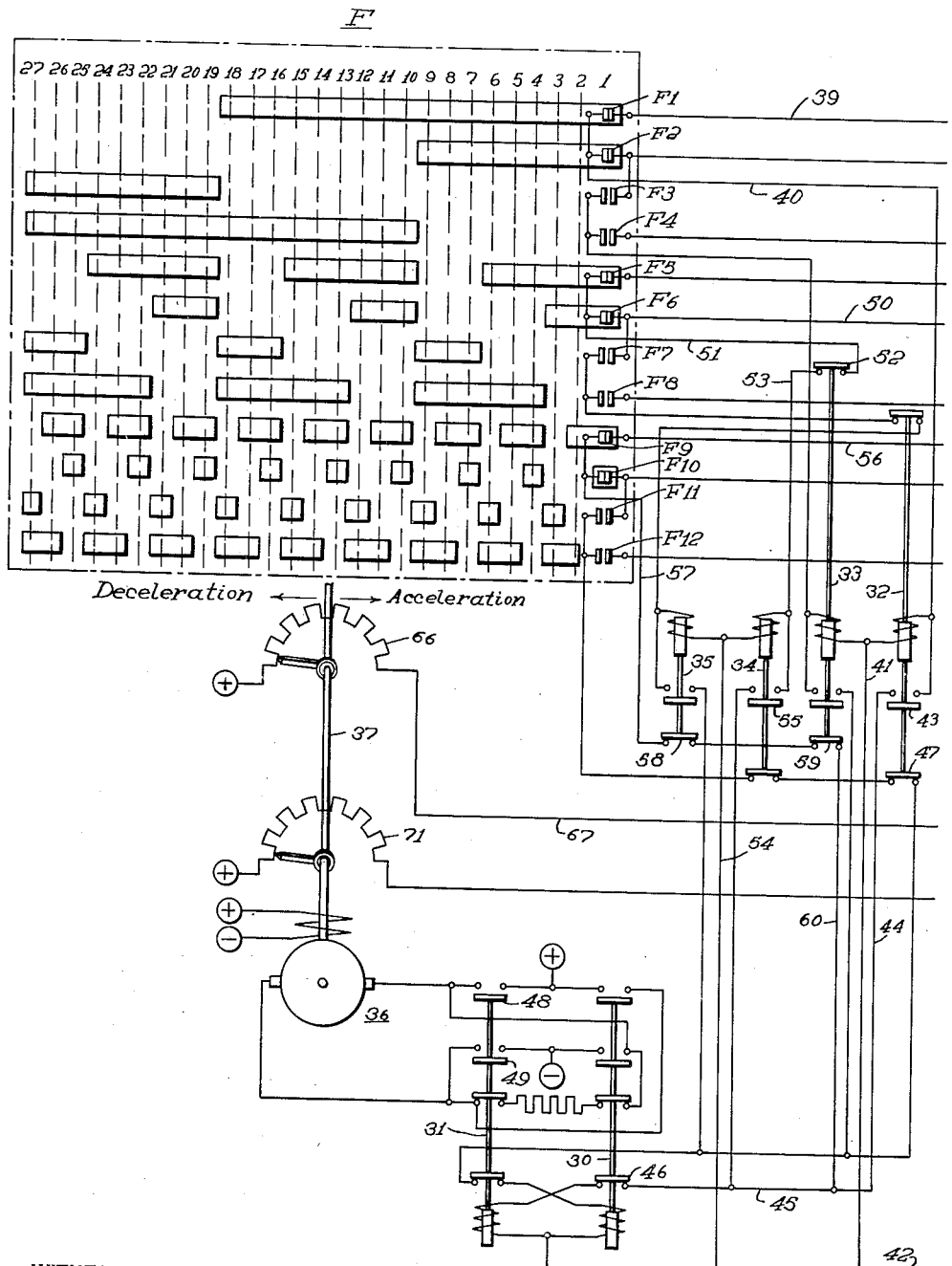

Sept. 2, 1941.  E. FRISCH  2,254,942
REMOTE CONTROL OF DRUM CONTROLLERS
Filed Sept. 9, 1939  2 Sheets-Sheet 1

INVENTOR
Erling Frisch.
BY
Paul E. Friedemann
ATTORNEY

WITNESSES:
Edward Michach
Wm. J. Ruano

Patented Sept. 2, 1941

2,254,942

UNITED STATES PATENT OFFICE 2,254,942

REMOTE CONTROL OF DRUM CONTROLLERS

Erling Frisch, Pittsburgh, Pa., assignor to Westinghouse Electric & Manufacturing Company, East Pittsburgh, Pa., a corporation of Pennsylvania Application September 9, 1939, Serial No. 294,076

4 Claims. (Cl. 172—239)

My invention relates to a remote control system including a master controller and remotely located follow-up controller rheostat or similar apparatus for the purpose of controlling the characteristics of an electric machine. More specifically, it is directed to a control system for a motor which drives a propeller such as on ships.

In numerous cases, where the operation of a drum controller, a rheostat or similar apparatus is controlled from a remotely located master controller, it may be necessary to have a definite timing between each controller point, and it may even be necessary to stop the controller motion momentarily at certain points until other operating sequences, initiated by the controller contacts, have been completed.

It is preferable and in many cases absolutely necessary that the operator be relieved of the responsibility of properly timing the main controller movement. The ideal arrangement is one where the operator can place the master controller directly in the desired position with the main controller following up with the proper timing.

An illustrative application is synchronous motor drives for vessels having pilot house control. In going from the "stop" position to an operating position or from "ahead" to "astern" direction, the starting or reversing and the synchronizing of the propelling motors and generators require an operating sequence, the timing of which may vary greatly with the momentary speed of the vessel and the weather conditions. It is obvious that the pilot, with his many other duties, cannot be expected to give any attention to the control sequence. An automatic follow-up is therefore the only solution.

A standard synchro-tie drive or a mechanical drive is, of course, not suitable for such applications as the follow-up is instantaneous. The synchro-tie has, in addition, the undesirable feature that faulty operation may result if the control voltage is interrupted, during operation. To be considered satisfactory, a follow-up control of this type must be absolutely positive and temporary loss of control voltage must not affect the operation. At the same time, the number of control wires required must be kept at a minimum.

An object of my invention is to provide a remote control system for an electrical machine which has a master controller and a remotely situated follow-up controller, which follow-up controller has a minimum number of contact members thereon for a predetermined number of control positions on the master controller.

Another object of my invention is to provide a remote control system for an electrical machine, such as a propeller motor on the ship, which includes a master controller and remotely situated follow-up controller, the latter being driven by a reversible motor and which includes a time delay feature in the follow-up movement of the follow-up control so as to provide a pause which will allow occurrence or removal of a certain condition (such as removal of an overload condition) before continuance of the follow-up movement of the follow-up controller.

Figure 1B:
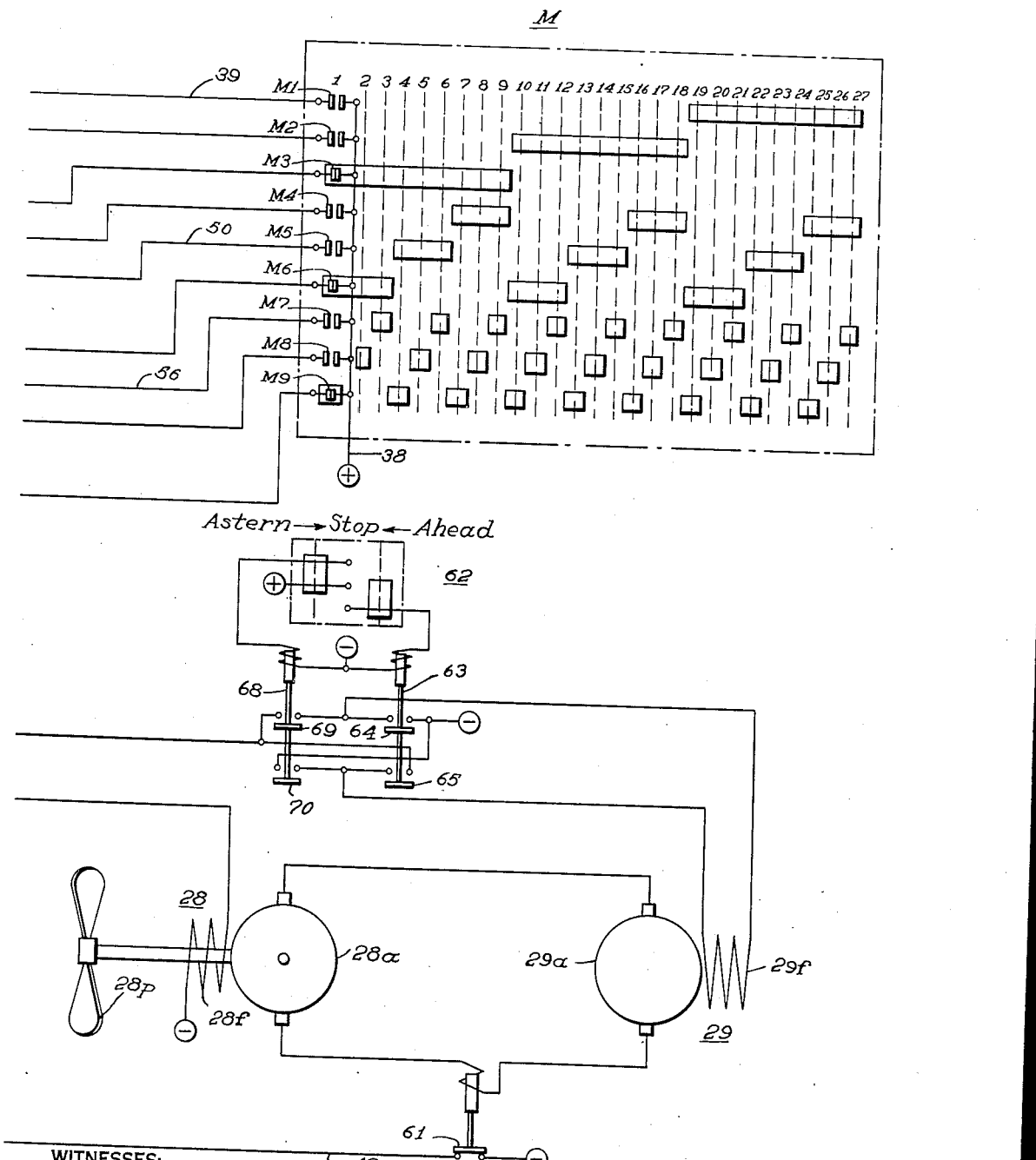

Other objects and advantages will become more apparent from a study of the following specification when considered in conjunction with the accompanying drawings, in which:

Figure 1A is a schematic showing of a portion of a control system for a ship propulsion motor embodying the principles of my invention; and Fig. 1B shows the remainder of the control system of Fig. 1A.

The control equipment, as shown in Figs. 1A and 1B, will give 27 points of regulation and consists of a master cam or drum controller M and a motor operated main controller with a direct connected follow-up cam or drum controller F. In addition, two pilot motor reversing contactors 30 and 31, and four auxiliary relays, 32, 33, 34 and 35, are required. The pilot motor 36 may drive the main controller shaft 37 through a standard reduction gear or preferably through a combination of a standard reduction gear and a Geneva gear (not shown). The latter has the advantage that it permits considerable overtravel of the motor without changing the controller positions.

A marine propulsion motor drive 28 comprises an armature 28a, a shunt field winding 28f and a propeller 28p energized by a direct current generator 29 having an armature 29a and a field winding 29f. The direction of rotation of propeller 28p is selected by selector switch 62. In other words, when it is desired to drive forward or ahead, selector switch 62 is placed in the "ahead" position thereby energizing relay 63 thereby closing contact members 64 and 65 and completing a generator energizing circuit which may be traced from the plus (+) terminal of a variable resistor 66 through such resistor, conductor 67, contact member 65, through the field winding 29f, contact member 64 to the minus (—) terminal. On the other hand, if it is desired to operate the ship in the reverse or astern direction, selector switch 62 is initially positioned moved to the "astern" position thereby energizing the relay 68 and closing contact members 69 and 70 so as to form an energizing circuit in the reverse direction through generator field winding 29f thereby causing a reversal of direction of motor 28 and propeller 28p. The motor shunt field winding 28f is energized through a variable resistor 71.

The master controller is provided with nine switches M1 to M9, while the follow-up controller has twelve switches F1 to F12. The closing sequence of both controllers is shown by means of drum developments. It has previously been necessary, by this type of follow-up control, to provide one master switch, one control wire, and two follow-up switches for each controller point, thereby practically prohibiting the use of the control where a great number of controller points were required.

The reduction in the number of switches and control wires has been made possible by dividing the controller travel into three main groups comprising points 1 to 9, 10 to 18, and 19 to 27, respectively. Each of these groups has again been divided into three intermediate groups, each comprising three controller points. When placing the master controller in a new position, switches M1 to M3, in conjunction with follow-up switches F1 to F4, will take over the control and move the main controllers to the first point in the main group in which the selected point is located. At this point, the control will be transferred to master controller switches M4 to M6 and follow-up control switches F5 to F8 which will cause the controller to be moved to the first point in the intermediate group to which the selected point belongs. Finally switches M7 to M9, with switches F9 to F12, will cause the controller to be moved to the selected point.

In order to get a clear understanding of the control sequence, let us assume that both controllers are in position No. 1 and that the master controller M has been moved to position No. 24, thereby closing master switches M1, M5 and M7. A control circuit will now be established from the plus control bus 38 through switch M1, conductor 39, the closed follow-up switch F1, conductor 40, the coil of auxiliary relay 32, conductor 41, to the minus control bus 42. The "make" relay contact 43 will close and complete a parallel circuit from conductor 40, through relay contact 43, conductors 44 and 45, contact member 46, the coil of contactor 31 and to the minus bus 42. (Opening of the normally closed contacts 47 of relay 32 will prevent contactor 30 from being energized.) The closing of contact members 48 and 49 will energize the pilot motor and move the follow-up drum controller in the direction as indicated by the arrow marked "Acceleration." This set-up will remain unchanged until the controller reaches position 19 (the first position of the main group to which position No. 24 belongs). At this position follow-up switch F1 opens and will deenergize relay 32 and contactor 31.

A secondary circuit will, however, be established immediately from the plus bus, through master switch M5, conductor 50, follow-up switch F6, which now is closed, conductor 51, contact members 52, conductor 53, the coil of relay 34, conductor 54, to the minus bus. Closing of the normally open contact member 55 will again energize contactor 31 and the controller drum will continue to rotate in the same direction. At point 22 follow-up switch F5 opens and will deenergize relay 34 and contactor 31.

A tertiary circuit will now be established from the plus bus, through master switch M7, conductor 56, follow-up switch F9, (which closes at this point), conductor 57, contact members 58 and 59, conductor 60, contact members 46 and the coil of contactor 31. The controller drum will therefore continue to run until switch F9 opens when position No. 24 is reached. All contactors and relays will now open and the motor will stop.

It is often desirable to stop the main controller at an intermediate point until a certain faulty condition is removed or until other operating sequences, initiated by the controller at this point, have been completed. This can be accomplished with this type of follow-up control by connecting a follow-up switch 61 in the minus bus. For example if it were desired to have such pause during an overload this switch is arranged to open as the result of an overload and will stop the pilot motor. When the overload has been eliminated, contacts 61 will close and the movement of the controller drum will be resumed. Contacts 61 may be the contacts of a time limit relay, a load current responsive contactor, interlock or of a limit switch likewise. In other words, contacts 61 may represent the contacts of any device which requires a pause or stopping of the controller at a particular speed to allow a certain operation to take place (as a switch to complete a circuit after a motor has come up to speed or a synchronizing switch to apply direct current energization to the field-winding of a synchronous motor for synchronization in an A. C. system, etc.) or for any reason whatsoever that requires a pause in the control sequence.

The same principle can, of course, be applied to controllers with a different number of operating points. By increasing the number of master switches and the control wires or conductors to 10, it is possible to obtain 36 positions. With the number increased to 11, the maximum number of controller positions will be 54, and 81 positions can be obtained by means of 12 control wires, etc.

I am, of course, aware that others, particularly after having had the benefit of the teachings of my invention, may devise other devices embodying my invention, and I, therefore, do not wish to be limited to the specific showings made in the drawings and the descriptive disclosure hereinbefore made, but wish to be limited only by the scope of the appended claims and such prior art that may be pertinent.

I claim as my invention:

1. A follow-up control system comprising, in combination, a master controller having a plurality of operating positions, said positions being divided into a plurality of groups, each group having a group contact segment, each of said groups being subdivided into a plurality of subgroups each having a subgroup contact segment, a plurality of pairs of contact members operable by said controller corresponding to the number of groups and subgroups, the group and subgroup contact segments each being effective to close a separate pair of said contact members for any controller position, a source of energizing potential having only one of its terminals permanently connected to one of the contact elements of each of said pair of contact members, a follow-up controller which is similarly divided into groups and subgroups of contact segments, and having a plurality of pairs of contact members operable thereby corresponding to the number of groups and subgroups of contact segments on the follow-up controller, a conductor which interconnects corresponding pairs of contact members of the master and follow-up controllers, circuit means including a reversible motor for driving said follow-up controller and a plurality of transfer relays for successively transferring a motor energizing circuit from one of said pair of closed contact members to the other on said master controller in response to predetermined successive follow-up movement in either of two directions of said follow-up controller.

2. A follow-up control system comprising, in combination, a master controller having a plurality of operating positions, said positions being divided into a plurality of groups each group having a group contact segment, each of said groups being subdivided into a plurality of subgroups each having a subgroup contact segment, each of said groups being subdivided into a plurality of individual positions each having an individual contact segment, a plurality of pairs of contact members operable by said controller corresponding to the number of groups, subgroups and individual positions, the group, subgroup and individual contact segments each being effective to close a separate pair of said contact members for any controller position, a source of energizing potential having solely one of its terminals permanently connected to corresponding contact elements of each of said pair of contact members, a follow-up controller which is similarly divided into groups, subgroups and individual positions of contact segments, and having a pair of contact members operable thereby also corresponding to the number of groups, subgroups and individual positions of contact segments on the follow-up controller, a conductor which interconnects corresponding pairs of contact members of the master and follow-up controllers, additional pairs of contact members on said follow-up controller, circuit means including a reversible motor for driving said follow-up controller and a plurality of transfer relays and said additional pair of contact members for successively transferring a motor energizing circuit from one of said pair of closed contact members of said group to the other of said subgroup, then to still another corresponding to a single position on said master controller in response to predetermined successive follow-up movements of said follow-up controller in either direction.

3. Apparatus as recited in claim 2 in which the respective contact segments of the group, subgroup and individual positions are equal in number and are symmetrically arranged on said master controller.

4. Apparatus as recited in claim 2 in which there are three group contact segments, each of which is subdivided into three subgroup contact segments and each of which subgroup segments is subdivided into three individual contact segments.

ERLING FRISCH.